United States Patent [19]

Yamauchi

[11] Patent Number: 5,593,013
[45] Date of Patent: Jan. 14, 1997

[54] FLUID COUPLING FOR AN ENGINE

[75] Inventor: Tsunekazu Yamauchi, Nishikasugai-gun, Japan

[73] Assignee: Aisin Seiki Kabushiki Kaisha, Kariya, Japan

[21] Appl. No.: 317,656

[22] Filed: Sep. 30, 1994

[30] Foreign Application Priority Data

Oct. 1, 1993 [JP] Japan .................................. 5-247130

[51] Int. Cl.⁶ ......................................................... F16D 31/00
[52] U.S. Cl. .............................. 192/58.682; 192/58.63; 192/58.7; 192/82 T
[58] Field of Search .................................. 192/58 B, 82 T; 588/58.682, 58.63, 58.7

[56] References Cited

U.S. PATENT DOCUMENTS

| | | | |
|---|---|---|---|
| 4,564,093 | 1/1986 | Storz | 192/58 B |
| 4,627,524 | 12/1986 | Hayashi et al. | 192/58 B |
| 4,880,095 | 11/1989 | Nakamura | 192/58 B |
| 4,909,368 | 3/1990 | Hayashi et al. | 192/58 B |
| 5,062,514 | 11/1991 | Kennedy et al. | 192/58 B |
| 5,070,980 | 12/1991 | Nakagawa | 192/58 B |
| 5,119,921 | 6/1992 | Drennen et al. | 192/58 B |
| 5,248,018 | 9/1993 | Debrabander | 192/58 B |
| 5,381,761 | 1/1995 | Tanaka | 192/58 B |

FOREIGN PATENT DOCUMENTS

| | | |
|---|---|---|
| 2943841 | 5/1980 | Germany. |
| 3832953 | 4/1989 | Germany. |
| 4103319 | 8/1991 | Germany. |

*Primary Examiner*—Andrea L. Pitts
*Attorney, Agent, or Firm*—Oblon, Spivak, McClelland, Maier & Neustadt, P.C.

[57] ABSTRACT

A fluid coupling for an engine includes a shaft, a housing rotatably supported on the shaft, a cover fixed to the housing, a separation plate which separates a chamber defined by the housing and the cover into a store chamber and an operation chamber, wherein the store chamber is formed with at least a first store chamber and a second store chamber which are mutually arranged in a circumferential direction of the fluid coupling. The fluid coupling for an engine further includes a first opening disposed on the separation plate connecting the first store chamber and the operation chamber, a second opening disposed on the separation plate connecting the second store chamber and the operation chamber, valve mechanism opens and closes the first opening and the second opening and a rotor disposed in the operation chamber and fixed on the shaft.

7 Claims, 6 Drawing Sheets

5,593,013

FLUID COUPLING FOR AN ENGINE

BACKGROUND OF THE INVENTION

1. Field of the Invention

This invention relates to a fluid coupling for an engine which controls the rotation speed of a cooling fan of a water-cooled engine, in particular relates a fluid coupling for an engine of a vehicle.

2. Description of the Related Art

A conventional fluid coupling for an engine is disclosed in Japanese Patent Laid Open No. 3(1991)-234931. The fluid coupling for an engine disclosed in the prior art comprises a shaft, a housing rotatably supported on the shaft, a cover fixed to the housing, a ring-shaped separation plate which separates a chamber defined by the housing and the cover into a store chamber and an operation chamber, valve means which open and close an opening disposed on the separation plate and a rotor disposed in the operation chamber and fixed on the shaft. The separation plate is formed with a first separation portion and a second separation portion which are arranged in series in the axial direction of the shaft so as to separate the store chamber into a first store chamber and a second store chamber. A diameter of an inner circumference of the first separation portion is provided to be smaller than that of the second separation portion so as to regulate a quantity of the fluid flows into the operation chamber.

However because the separation portions are arranged in series in the axial direction of the shaft so as to form the first store chamber and the second store chamber, the fluid coupling is enlarged and includes a large amount of the fluid. Further, because the separation portions can not easily mounted in the store chamber, the fluid coupling can not easily assembled.

SUMMARY OF THE PRESENT INVENTION

It is an object of the present invention to provide a fluid coupling for an engine which is small in size and light in weight.

It is another object of the present invention to provide a fluid coupling for an engine which can be operated by a small amount of the operation fluid.

It is a further object of the present invention to provide a fluid coupling for an engine which can be easily manufactured.

It is a further object of the present invention to provide a fluid coupling for an engine which has a durability.

It is a further object of the present invention to provide a fluid coupling for an engine which is available for any kinds of engine.

It is a further object of the present invention to provide a fluid coupling for an engine which is low in cost.

To achieve the above mentioned objects, a fluid coupling for an engine in accordance with this invention comprises a shaft, a housing rotatably supported on the shaft, a cover fixed to the housing, a separation plate which separates a chamber defined by the housing and the cover into a store chamber and an operation chamber, wherein the store chamber is formed with at least a first store chamber and a second store chamber which are arranged in a circumferential direction of the fluid coupling for an engine each other, a fluid coupling for an engine further comprises a first opening disposed on the separation plate connecting the first store chamber and the operation chamber, a second opening disposed on the separation plate connecting the second store chamber and the operation chamber, valve means open and close the first opening and the second opening and a rotor disposed in the operation chamber and fixed on the shaft.

BRIEF DESCRIPTION OF THE DRAWINGS

The features and advantages of the fluid coupling for an engine according to the present invention will be more clearly appreciated from the following description in conjunction with the accompanying drawings wherein.

DETAILED DESCRIPTION OF A PREFERRED EMBODIMENTS OF THE INVENTION

Figure 1:
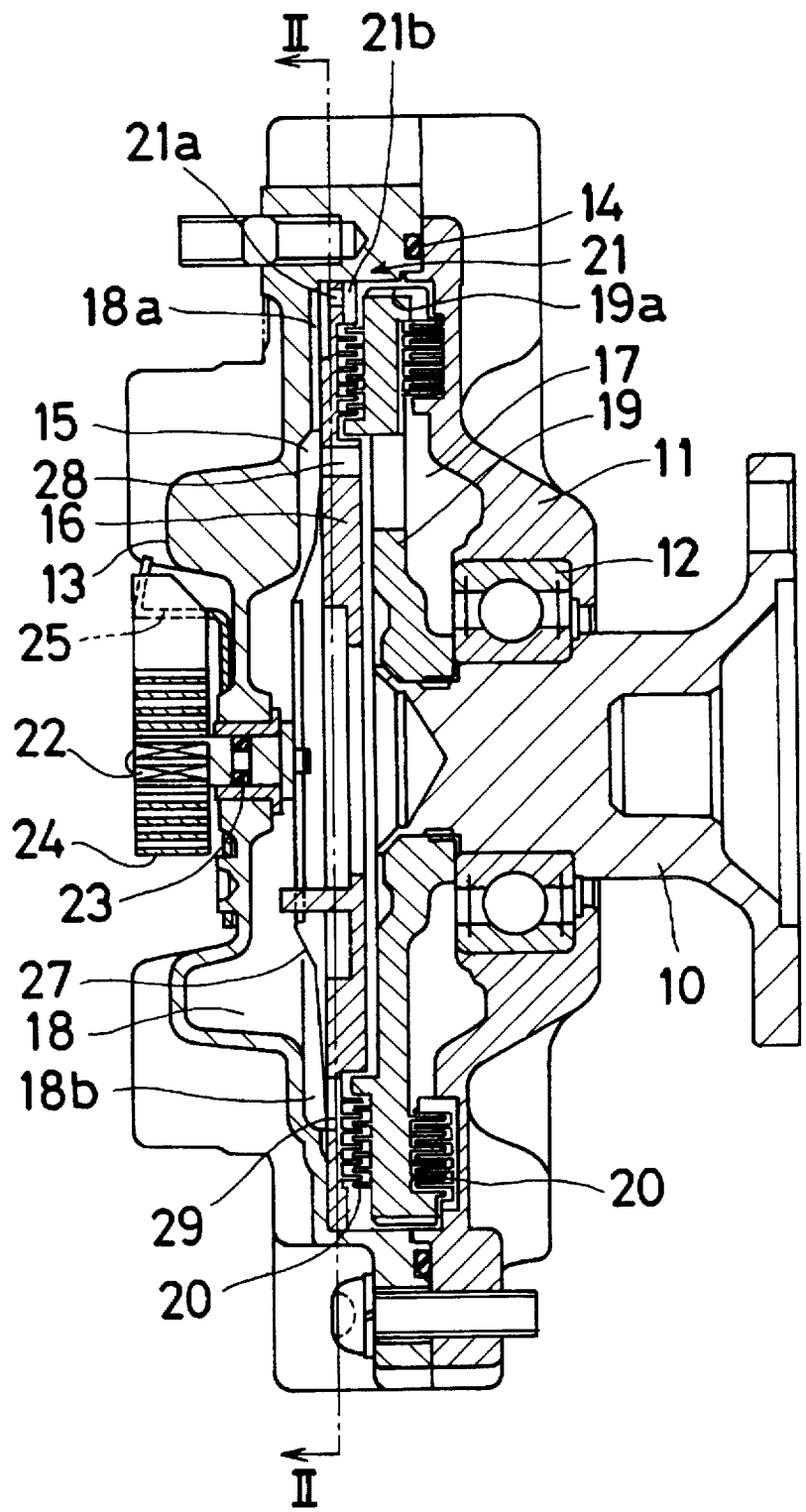
FIG. 1 is a sectional view of a fluid coupling for an engine of the present invention.

In FIG. 1, a fluid coupling for an engine comprises a shaft 10 which is connected with driving means (not shown in the FIGURES) at one end thereof so as to be rotatably supported on a housing 11 through a bearing 12. A cover 13 is fixed to a side portion of the housing 11 through a seal member 14. A cooling fan (not shown in the FIGURES) is mounted on an outer circumferential portion of the housing 11. A chamber 15 is defined by the housing 11 and the cover 13. The chamber 15 is separated into an operation chamber 17 and a store chamber 18 by a ring-shaped separation plate 16 fixed to the cover 13 at an outer circumferential end thereof.

A rotor 19 disposed in the operation chamber 17 fixed on the other end of the shaft 10 so as to be rotated with the shaft 10 integrally. Labyrinth grooves 20 formed into a circumferential configuration is disposed between a left side of the housing 11 and a right side of the rotor 19 and between a left side of the rotor 19 and a right side of the separation plate 16 as shown in the FIG. 1.

A pumping hole 21a and a pumping projection portion 21b are disposed on the separation plate 16 at the circumferential portion thereof. Further, pumping grooves 19 is also provided on a circumferential end portion of the rotor 19. A pumping mechanism 21 is formed with the pumping hole 21a, the pumping projection portion 21b and the pumping grooves 19a. Although one of the pumping mechanisms 21 is shown in the FIG. 1, it is to be understood that the number of the pumping mechanisms 21 is not intended to be limited to the specific embodiment.

Figure 2:
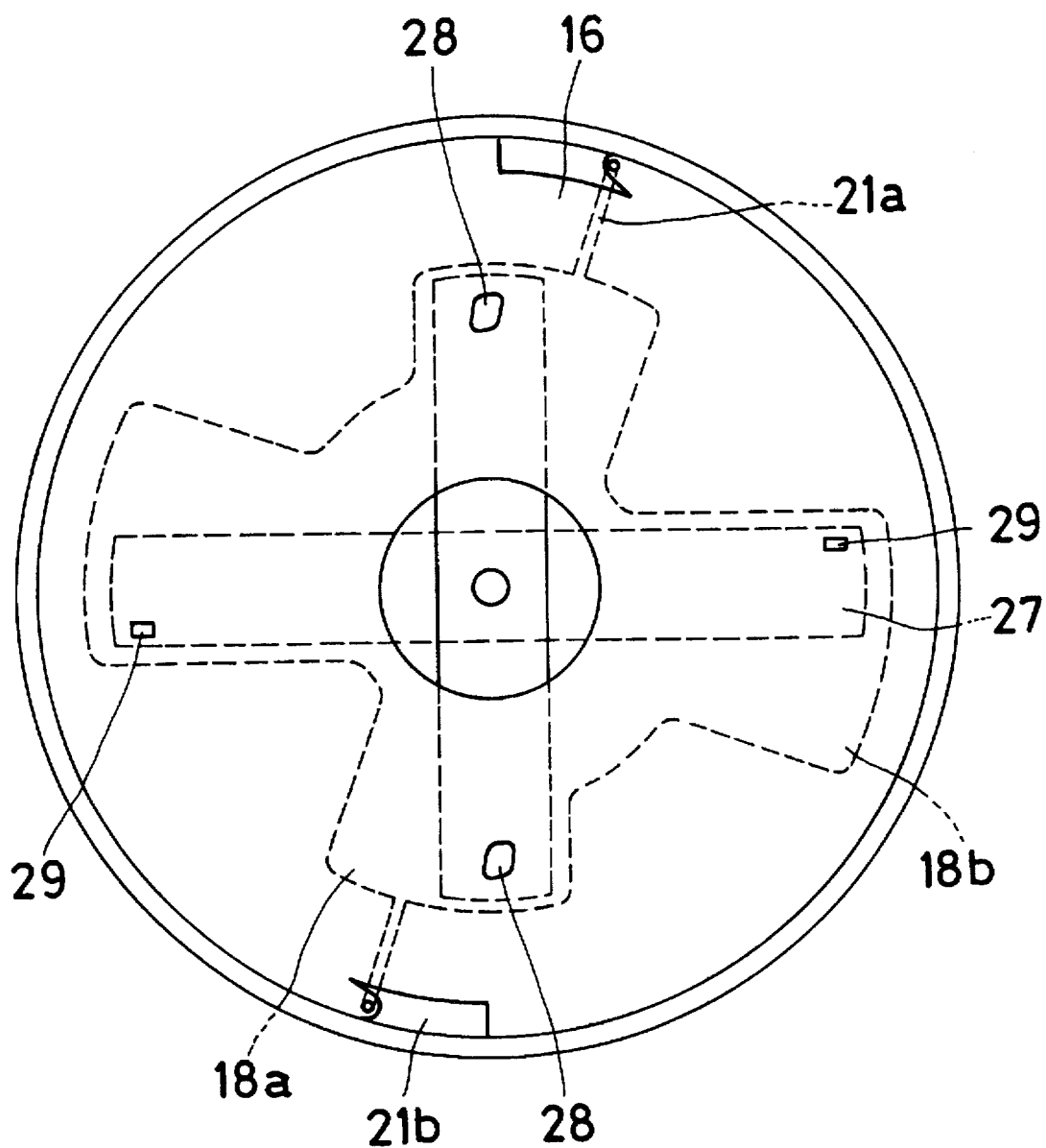
FIG. 2 is a sectional view of a fluid coupling for an engine taken on line II—II of the FIG. 1.

As shown in the FIG. 2, the store chamber 18 is formed with a pair of first store chambers 18a and a pair of second store chambers 18b. Each of a pair of first openings 28 is disposed on the separation plate 16 so as to connect the first store chamber 18a and the operation chamber 17. Further, each of a pair of second openings 29 is disposed on the separation plate 16 so as to connect the second store chamber 18b and the operation chamber 17. A valve mechanism 27 is mounted on one end of a rod 22 at a center thereof. The valve mechanism 27 rotates about the rod 22 so as to open and close the openings 28, 29. The openings 28, 29 are located on the separation plate 16 so that the second openings 29 may be earlier opened than the first openings 28 and that the second openings 29 may be later closed than the first openings 28.

The rod 22 is rotatably mounted on the cover 13 through a seal member 23. A curl-shaped bimetal 24 is fixed to the other end of the rod 22 at an inner circumferential end thereof. Further, an outer circumferential end of the bimetal 24 is fixed to a holder 25 which is fused to the cover 13. Each of the operation chamber 17 and the store chamber 18 is filled with a viscous fluid 26 (for example a silicon oil).

An operation of the fluid coupling for an engine according to the above embodiment will be described hereinafter. The fluid coupling for an engine is disposed behind a radiator (not shown in the FIGURES) of a vehicle since the fluid coupling for an engine is mainly used for controlling a rotational speed Nf of a cooling fan of the engine of the vehicle.

Temperature T of the air in front of the bimetal 24 which has passed through the radiator is low because the temperature of a cooling water in the radiator is low when the engine starts to be driven. Therefore, the bimetal 24 is not operated so as to close the openings 28, 29 as shown in the FIG. 2.

Figure 3:
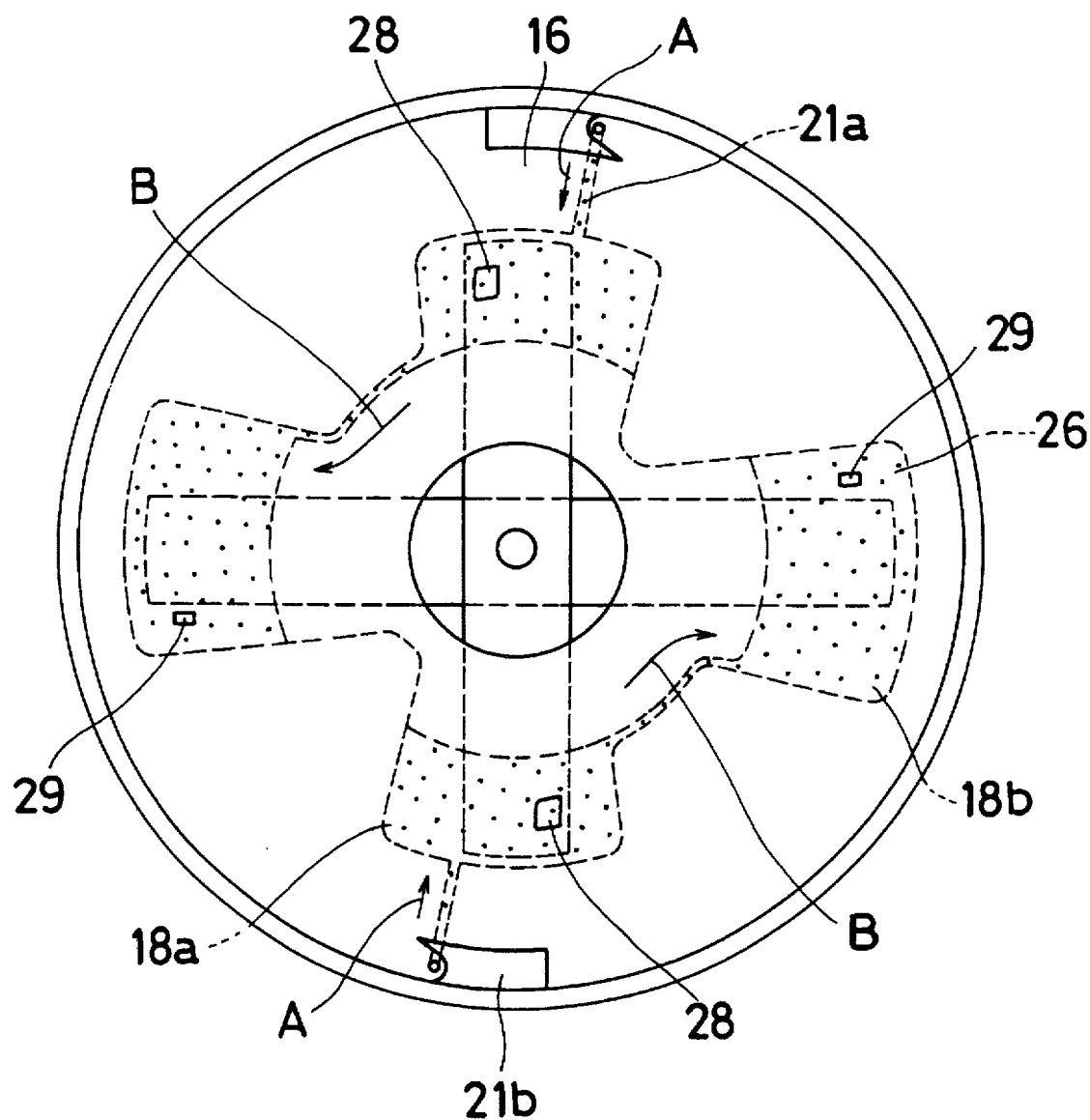
FIG. 3 is a sectional view of a fluid coupling for an engine taken on line II—II of the FIG. 1 corresponding to the MID condition of the FIG. 6.

The rotor 19 rotates with the shaft 10 driven by the driving means so that most of the viscous fluid 26 may flow into the store chamber 18 from the operation chamber 17 by the operation of the pumping mechanism 21. As shown in the FIG. 3, the viscous fluid 26 which flows into the first store chambers 18a through the pumping hole 21a (indicated by arrows A) overflows into the second store chambers 18b indicated by arrows B when each of the first store chambers 18a is filled up with the viscous fluid 26. Therefore, because a little amount of the viscous fluid 26 flows through the labyrinth grooves 20, an amount of driving torque transmitted from the rotor 19 to the housing 11 is small. Consequently, the rotational speed Nf of the cooling fan fixed to the housing 11 is low shown as OFF condition of the FIG. 6.

The higher the temperature of the cooling water becomes, the higher the temperature T of the air in front of the bimetal 24 which has passed through the radiator becomes. Therefore, the valve mechanism 27 opens the second openings 29 corresponding to the operation of the bimetal 24 so as to flow the viscous fluid 26 in the second store chambers 18b into the operation chamber 17 as shown in the FIG. 3. Because the viscous fluid 26 which flows into the operation chamber 17 through the second openings 29 flows through the labyrinth grooves 20, a predetermined torque corresponding to the quantity of the viscous fluid 26 which flows through the labyrinth grooves 20 is transmitted from the rotor 19 to the housing 11. Therefore, the cooling fan rotates with a predetermined rotational speed indicated by a real line of MID condition shown in the FIG. 6.

Figure 4:
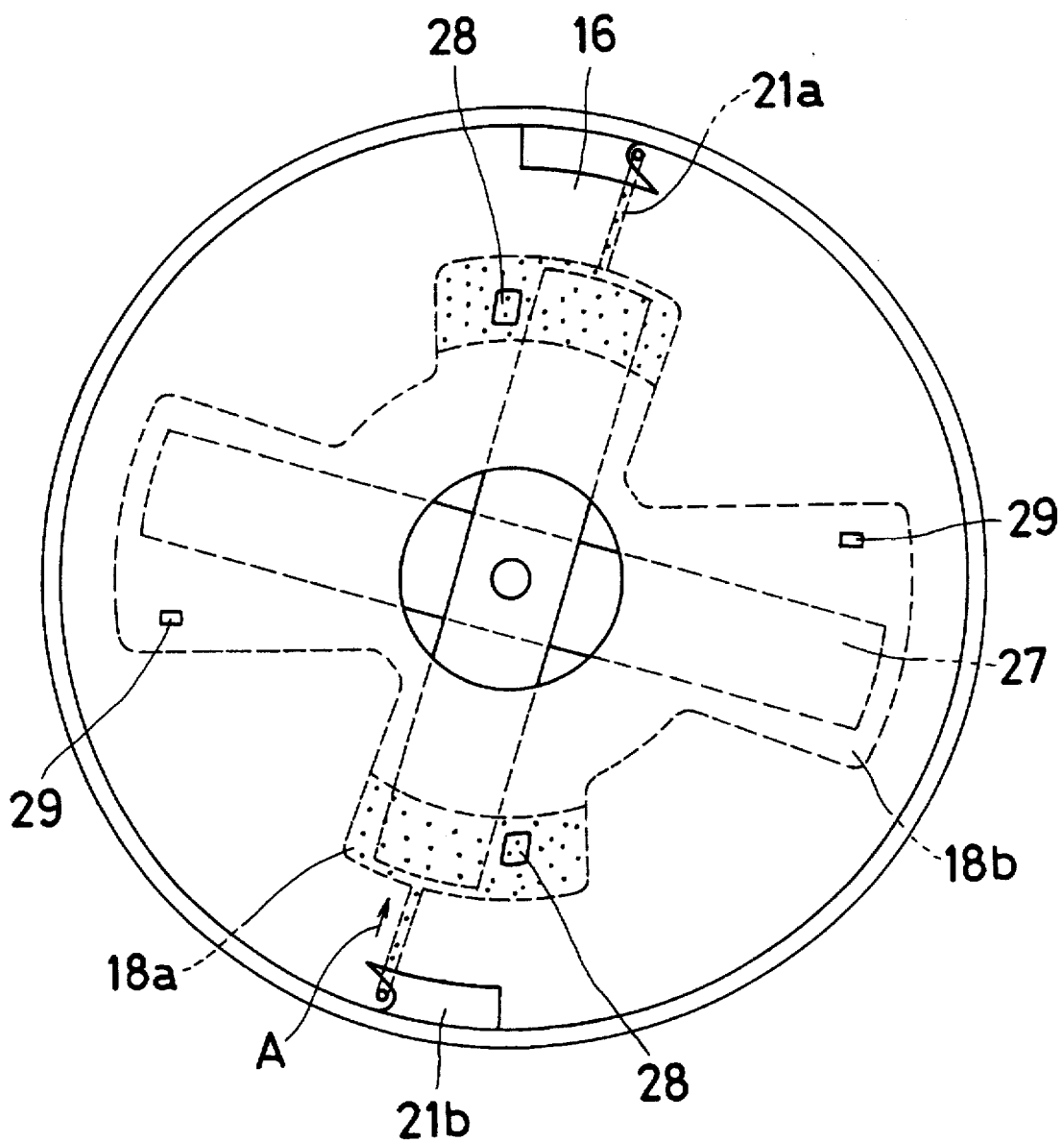
FIG. 4 is a sectional view of a fluid coupling for an engine taken on line II—II of the FIG. 1 corresponding to the ON condition of the FIG. 6.

When the temperature of the cooling water further becomes high, the temperature T of the air in front of the bimetal 24 which has passed through the radiator also further becomes high. The valve mechanism 27 opens the first openings 28 corresponding to the operation of the bimetal 24 in addition to the second openings 29 as shown in the FIG. 4. The viscous fluid 26 in the first store chambers 18a continually flows into the labyrinth grooves 20 through the first openings 28 without flowing into the second store chambers 18b. Therefore, because a large amount of the viscous fluid 26 flows through the labyrinth grooves 20, a large torque corresponding to the quantity of the viscous fluid 26 which flows through the labyrinth grooves 20 is transmitted from the rotor 19 to the housing 11. Consequently, the cooling fan rotates with a high rotational speed indicated as ON condition of the FIG. 6. In accordance with the invention, the fluid coupling for an engine can control the rotational speed Nf of the cooling fan with three stages. Further, because the plurality of store chambers 18a, 18b are mutually arranged in the circumferential direction of the fluid coupling, the fluid coupling for an engine can be small in the axial direction of the shaft 10 and can be operated by a small amount of the viscous fluid. Furthermore, the fluid coupling for an engine can be easily assembled.

Figure 5:
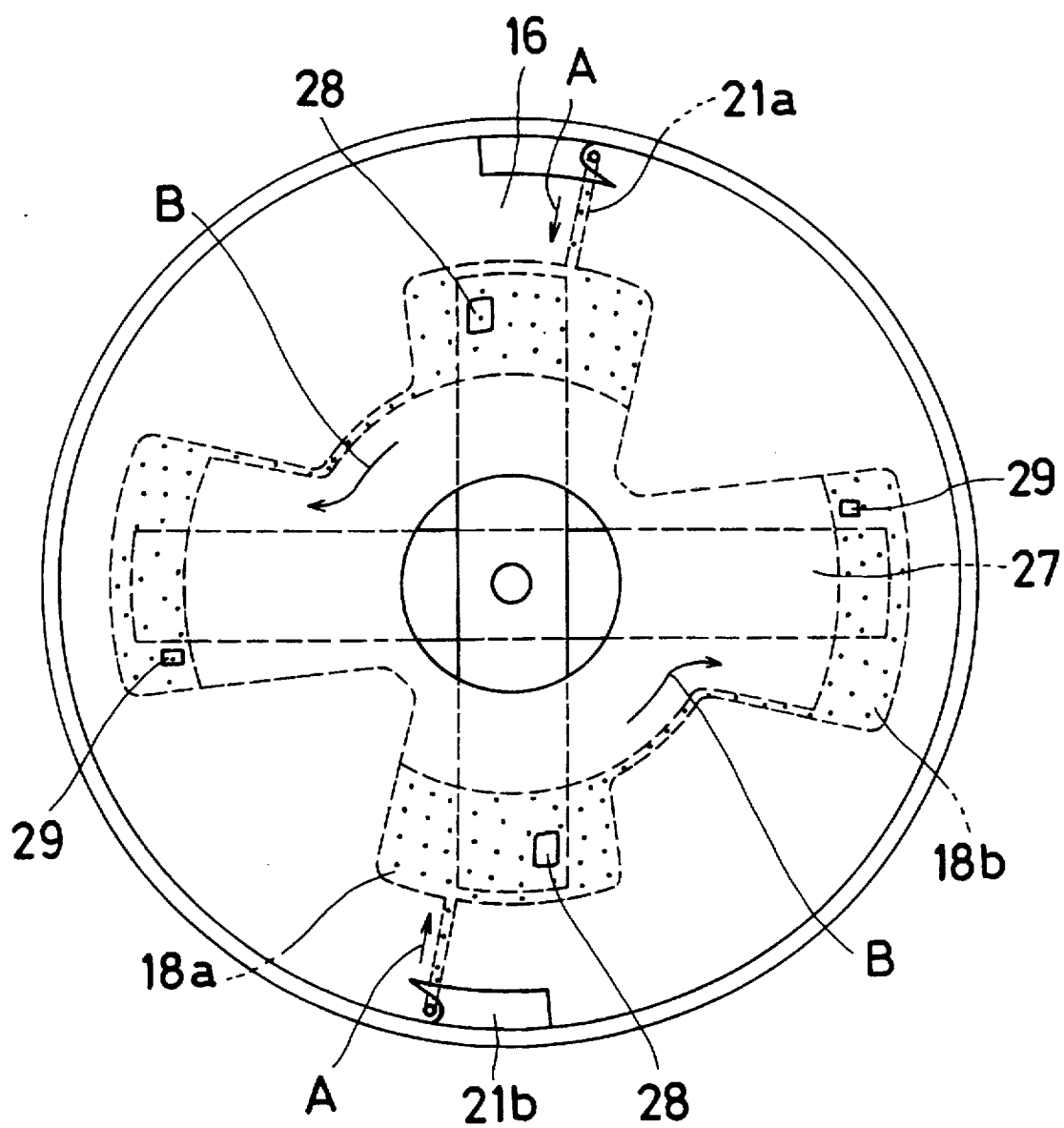
FIG. 5 is a sectional view of a second embodiment of a fluid coupling for an engine corresponding to the FIG. 3.
Figure 6:
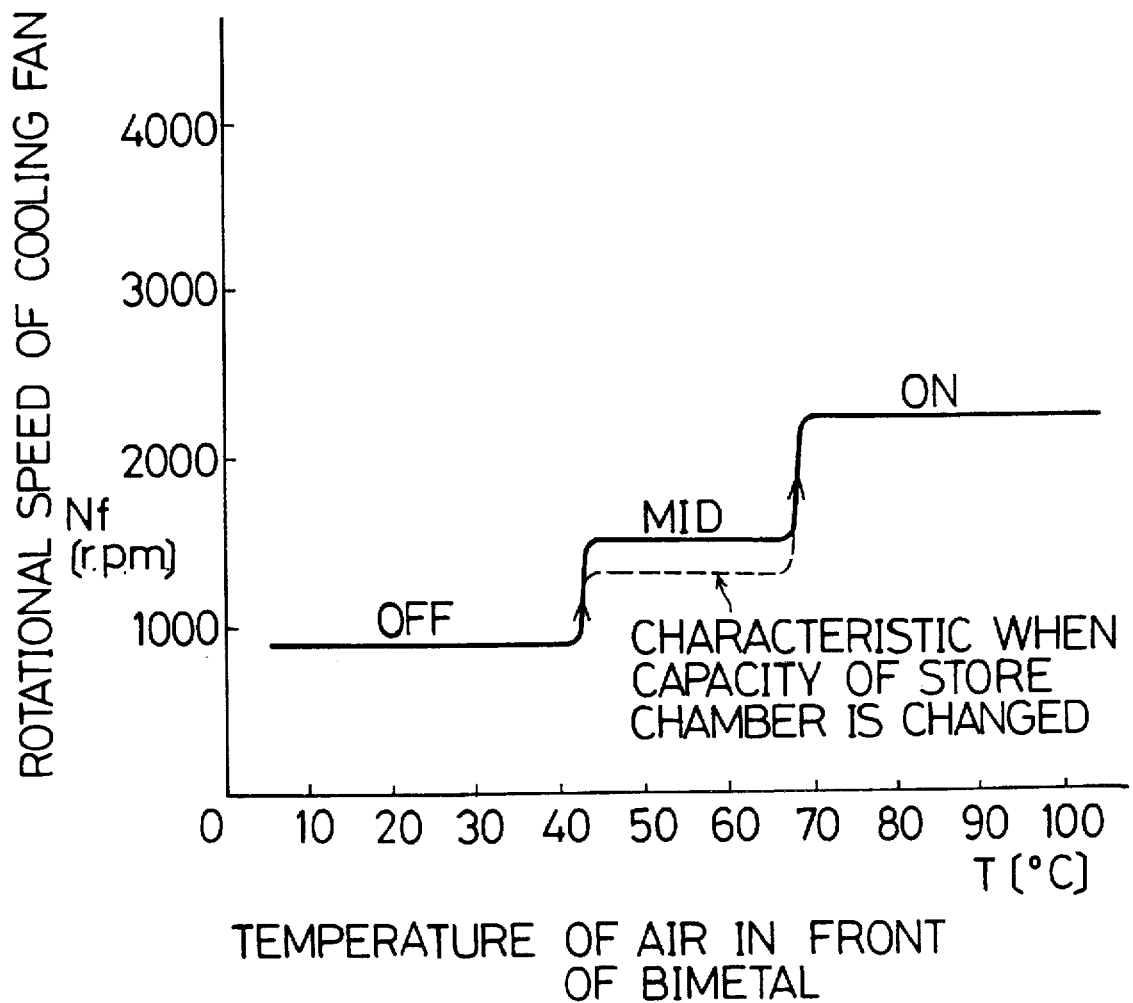
FIG. 6 is a diagrammatic view illustrating the characteristic between the temperature T of the air in front of the bimetal which has passed through the radiator and the rotational speed Nf of the cooling fan.

As shown in the FIG. 6 Indicated by a dotted line, the rotational speed Nf of the cooling fan under the MID condition can be alternated by changing the capacities of the second store chambers 18b. In accordance with a second embodiment shown in the FIG. 5, the capacities of portions of the second store chambers 18b located at an inner circumferential side relative to the second opening 29 is smaller than that of the first embodiment shown in the FIG. 3. Therefore, referring to the second embodiment of the FIG. 5 the quantity of the viscous fluid 26 which flows out from the second openings 29 to the labyrinth grooves 20 by centrifugal force is smaller than that of the first embodiment.

While the invention has been particularly shown and described with reference to preferred embodiment thereof, it will be understood by those skilled in the art that the foregoing and other changes in form and details can be made therein without departing from the spirit and scope of the invention.

What is claimed is:

1. A fluid coupling for an engine comprising:

a shaft;

a housing rotatably supported on the shaft;

a cover fixed to the housing;

a separation plate which separates a chamber defined by the housing and the cover into a store chamber and an operation chamber;

wherein the store chamber is formed with at least a first store chamber and a second store chamber which are mutually arranged in a circumferential direction of the fluid coupling;

a first opening disposed on the separation plate connecting the first store chamber and the operation chamber;

a second opening disposed on the separation plate connecting the second store chamber and the operation chamber;

valve means for opening and closing the first opening and the second opening; and a rotor disposed in the operation chamber and fixed on the shaft.

2. A fluid coupling for an engine as recited in claim 1, wherein the first store chamber and the second store chamber are mutually defined by the cover in the circumferential direction of the fluid coupling.

3. A fluid coupling for an engine as recited in claim 2, wherein the first store chamber is paired and the second store chamber is paired so that each of the first store chambers is located therebetween in the circumferential direction of the fluid coupling.

4. A fluid coupling for an engine as recited in claim 1, further comprising two labyrinth grooves which are located in the operation chamber and which are formed between the rotor and the housing and between the rotor and the separation plate.

5. A fluid coupling for an engine as recited in claim 4, wherein the first store chamber is connected to one of the labyrinth grooves through the first opening and the second store chamber is connected to the other of the labyrinth grooves through the second opening.

6. A fluid coupling for an engine as recited in claim 5, wherein one of the first and second openings is opened earlier than the other by the valve means in response to rising of an atmosphere temperature and is closed later than by the valve means in response to sinking of an atmosphere temperature.

7. A fluid coupling for an engine as recited in claim 1, further comprising a pumping mechanism disposed on circumferential portions of the separation plate and the rotor.

* * * * *